United States Patent [19]

Sear

[11] 4,125,578
[45] Nov. 14, 1978

[54] RECLAIMED VULCANIZED RUBBER

[75] Inventor: Derek W. Sear, Wilmslow, England

[73] Assignee: Setech International Limited, St. Peter Port, United Kingdom

[21] Appl. No.: 802,557

[22] Filed: Jun. 1, 1977

Related U.S. Application Data

[63] Continuation of Ser. No. 561,255, Mar. 24, 1975, abandoned.

[30] Foreign Application Priority Data

Mar. 29, 1974 [GB] United Kingdom ............... 14168/74

[51] Int. Cl.$^2$ ........................ C01B 31/02; B29H 19/00
[52] U.S. Cl. ................................... 264/29.5; 201/2.5; 201/25; 260/2.3; 264/80; 264/83; 264/347; 264/DIG. 69
[58] Field of Search ................ 264/340, 347, DIG. 69, 264/80, 37, 77, 83, 126, 29.5; 201/2.5, 25; 260/2.3

[56] References Cited

U.S. PATENT DOCUMENTS

| | | | |
|---|---|---|---|
| 1,963,943 | 6/1934 | Gross | 264/37 |
| 2,648,097 | 8/1953 | Kritchever | 264/80 |
| 2,795,820 | 6/1957 | Grow et al. | 264/80 |
| 3,368,013 | 2/1968 | Pisciotta et al. | 264/126 |
| 3,678,016 | 7/1972 | Zimmerman et al. | 260/78.4 D |
| 3,703,488 | 11/1972 | Morton | 260/2.3 |
| 3,767,601 | 10/1973 | Knox | 260/2.3 |
| 4,029,550 | 6/1977 | Mitsui | 201/2.5 |

FOREIGN PATENT DOCUMENTS

| | | |
|---|---|---|
| 580,051 | 8/1946 | United Kingdom. |
| 1,034,028 | 6/1966 | United Kingdom. |
| 1,278,258 | 6/1972 | United Kingdom. |
| 1,283,866 | 8/1972 | United Kingdom. |
| 1,405,170 | 9/1975 | United Kingdom. |

OTHER PUBLICATIONS

*Rubber World,* 2-1970, "Downwind, Akron Stinks!", pp. 45-50.

*Primary Examiner*—Jeffery R. Thurlow
*Attorney, Agent, or Firm*—Bacon & Thomas

[57] ABSTRACT

Vulcanized rubber is reclaimed by treating pieces of the rubber to render a surface layer of each piece plastic while the inner core of the piece remains non-plastic. A chemical reagent can be used in the treatment, but it is preferred to render the surface layers of the rubber pieces plastic by a heat treatment which involves direct exposure of the pieces of rubber to either a flame or a heated gas. In a preferred embodiment of the invention vulcanized rubber pieces are dropped under gravity into a flame so that any attached textile residues are burnt away simultaneously with the plasticizing of the surface layers of the pieces, and the heated pieces then enter a stream of cold air which quenches the heat treatment.

Vulcanized rubber articles made from the rubber reclaimed by the method of the invention have improved properties as compared with articles made by the conventional methods of reusing vulcanized rubber.

10 Claims, 4 Drawing Figures

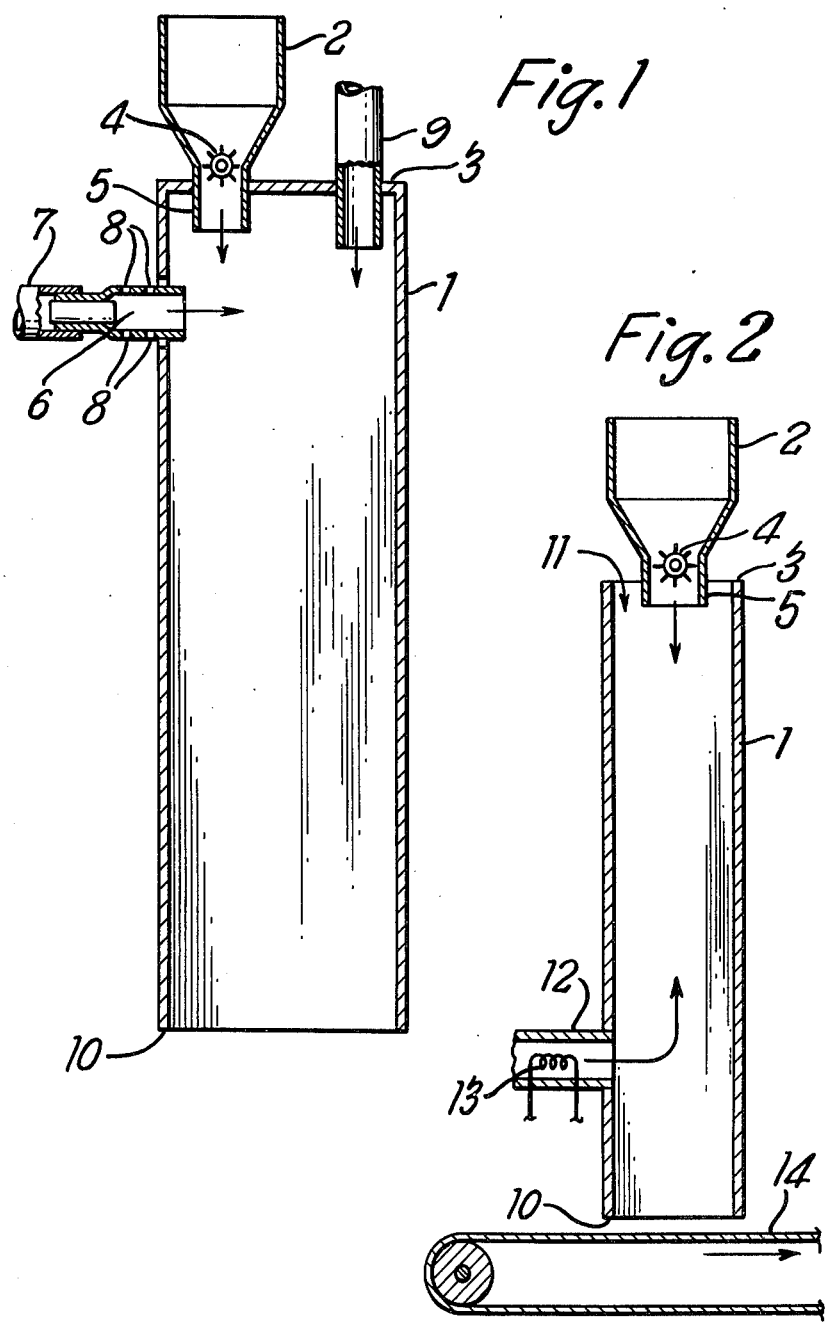

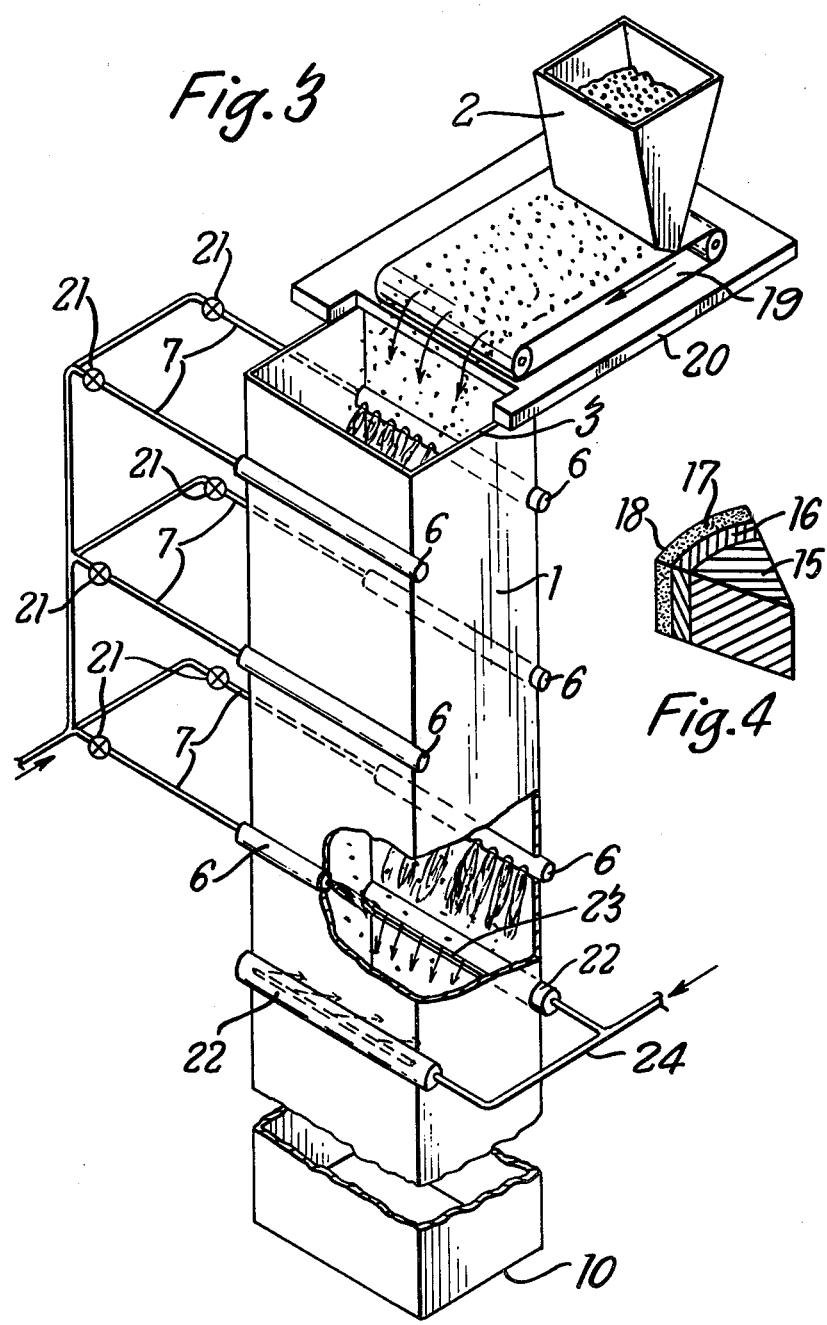

RECLAIMED VULCANIZED RUBBER

This is a continuation of application Ser. No. 561,255, filed Mar. 24, 1975, now abandoned.

BACKGROUND OF THE INVENTION

This invention relates to methods and apparatus for treating cross-linked non-plastic rubber, for example vulcanised rubber.

It is known to recover cross-linked (for example vulcanised) non-plastic rubber for re-use. In most of the known methods for re-use of vulcanised rubber, vulcanised rubber scrap material is prepared in one of two forms. Either the treatment may be essentially mechanical, the vulcanised rubber being separated from contaminants such as pieces of metal or textile residues and subsequently ground and graded to provide a free-flowing rubber crumb in which the rubber is still vulcanised and non-plastic for use as the rubber crumb, or the rubber crumb may be further treated by a combination of mechanical work, action of chemical additives and application of heat to form a material which is commonly referred to as "reclaim rubber". "Reclaim rubber" is no longer vulcanised and is once more plastic and capable of shaping and subsequent re-vulcanisation. "Reclaim rubber" takes the form of a homogeneous mass which may be handled in the same way as ordinary unvulcanised rubber.

It will be appreciated that it is considerably more expensive to prepare "reclaim rubber" than it is to prepare a vulcanised rubber crumb from scrap rubber materials.

Vulcanised rubber crumb has been included in unvulcanised rubber compound, usually in minor proportions, to improve ease of processing during shaping, such as extrusion or calendering prior to vulcanisation. Of increasing importance has been the inclusion of vulcanised rubber crumb to reduce the cost of the final rubber product since scrap rubber is generally available at lower cost than unvulcanised rubber compound. However, there is a disadvantage that the inclusion of vulcanised rubber crumb in unvulcanised rubber compounds results in weaker products being obtained when the rubber compounds are vulcanised. Weakening becomes particularly apparent when vulcanised rubber crumb is added to the unvulcanised rubber compound in an amount of the order of 25% by weight or more in terms of the final product.

These mechanical weaknesses are believed to be due to the occurrence on deformation of concentrations of stress at the interfaces between the particles of the vulcanised rubber crumb and the rubber compounds in which they are incorporated. These interfaces are present because the surfaces of the vulcanised rubber crumb are non-plastic and are, therefore, not miscible with the surrounding rubber compound before that rubber compound is vulcanised to form the final product. In consequence a clearly defined multiplicity of adhesive interfaces is present and these give rise to the stress concentrations which lead to mechanical weakness. Accordingly the re-use of vulcanised rubber crumb with rubber compounds which are subsequently vulcanised seldom yields a product which is comparable to the same article made from a newly vulcanised rubber compound.

On the other hand the fully plasticised "reclaim rubber" which is obtained by breaking down the vulcanisation of the rubber crumb suffers from the disadvantage that it is so weakened by the reclaiming process that products obtained on subsequent revulcanisation exhibit only relatively moderate strength which is significantly less than the strength of the vulcanised rubber from which the "reclaim rubber" is prepared.

SUMMARY OF THE INVENTION

It is an object of the present invention to provide an alternative method of treating cross-linked non-plastic rubber so that it may be re-used.

According to the present invention there is provided a method of treating pieces of cross-linked non-plastic rubber in which a surface layer of each piece is rendered plastic while an inner core of the piece remains non-plastic.

For ease of handling, it is preferred for the cross-linked non-plastic rubber to be treated in particulate form. The surface layers of the pieces of cross-linked non-plastic rubber may be treated with a chemical reagent or by a method which involves the use of a chemical reagent in combination with application of heat in order to render them plastic.

However, in the preferred methods the surface layers of the pieces of cross-linked non-plastic rubber are rendered plastic by application of heat alone. The heat may be applied either by causing a flame to play directly upon the surface layers of the pieces of cross-linked non-plastic rubber or by applying heated gas to the surface layers of the pieces of cross-linked non-plastic rubber. The gas may be heated by any convenient means. For example, electrical heating may be employed. The heated gas may, for example, be air, or a non-oxidizing gas such as gaseous combustion products or nitrogen.

The pieces of rubber may be passed through a single zone of heat or through a plurality of zones of heat. The pieces may be passed through flame or heated gas in a batch process in which the pieces are placed on a substantially horizontal surface and flame or heated gas is caused to play upon the pieces, and to be moved across the surface in order to effect passage of the pieces through the zone or zones of heat, or the pieces may be treated in a continuous process, for example by spreading the pieces across the surface of a conveyor belt and moving the pieces on the conveyor belt through flame or heated gas. However, it is preferred for the pieces to be permitted to fall under gravity through flame or heated gas.

Treated pieces obtained from vulcanised rubber may be shaped together with unvulcanised rubber by moulding the treated pieces and the unvulcanised rubber under pressure and heat in the presence of sufficient vulcanising ingredients only to vulcanise the unvulcanised rubber and the plasticised rubber in the surface layers of the treated pieces.

Treated pieces obtained from vulcanised rubber may alternatively be formed into a shaped article without the addition of unvulcanised rubber and the treated pieces may be moulded under pressure and heat in the presence of sufficient vulcanising ingredients only to vulcanise the plasticised rubber in the surface layers of the treated pieces. Furthermore, it has been found that it is not always necessary to introduce additional vulcanising ingredients to the treated pieces in order to obtain a vulcanised shaped article by moulding the treated pieces under pressure and heat.

The particularly preferred methods in accordance with the present invention are those methods which involve passing pieces of vulcanised rubber through a zone or zones of heat of sufficient intensity to cause devulcanisation and/or partial depolymerisation of the surface layers of the pieces. Examples of vulcanised rubbers which are suitable for treatment by application of heat in order to render the surface layers of pieces of the vulcanised rubber plastic include natural rubber, butadiene-styrene copolymers, vulcanised copolymers of isobutylene and vulcanised copolymers of ethylene and propylene.

BRIEF DESCRIPTION OF THE DRAWINGS

FIG. 1 shows a cross-section through a particularly preferred embodiment of apparatus for thermal treatment of rubber crumb, FIG. 2 shows a cross-section through an alternative embodiment of apparatus for thermal treatment of rubber crumb, FIG. 3 is a diagrammatic view of a third embodiment of apparatus for thermal treatment of rubber crumb, and FIG. 4 shows a segment of a piece of rubber crumb which has been treated by a method in accordance with the present invention.

DETAILED DESCRIPTION

In the drawings, the same or similar parts are designated by like reference numerals.

Referring to FIG. 1 of the drawings, the apparatus includes a reaction chamber 1 which is advantageously made of metal. A hopper 2 is provided at the upper end 3 of the reaction chamber 1. The hopper 2 is provided with feeder means which includes a feed control mechanism 4 and a chute 5. A gas burner 6 is mounted in the side of the reaction chamber 1 beneath the chute 5.

The gas burner 6 is connected to a gas supply through a connecting tube 7, and a plurality of air holes 8 enable air for the combustion of gas from the gas supply to enter the gas burner 6.

When the gas burner 6 is in operation it provides a region of hot gas comprising flame, hot air and gaseous combustion products which stream across the chamber 1 from the side of the chamber 1 in which the gas burner 6 is mounted towards the opposite side of the chamber 1.

An air inlet 9 is mounted in the top 3 of the reaction chamber 1 towards the opposite side of the chamber 1 from the gas burner 6. The air inlet 9 is connected to an air supply for providing a downwardly directed flow of cooling air on the side of the reaction chamber 1 remote from the gas burner 6. The bottom end 10 of the reaction chamber 1 is open.

In operation of the apparatus of FIG. 1, rubber crumb is loaded into the hopper 2 and is fed at a controlled rate by the feed control mechanism 4 through the chute 5 into the reaction chamber 1. The rubber crumb falls under the action of gravity into the zone of heat provided by the gas burner 6. The stream of flame, heated air and gaseous combustion products from the gas burner 6 cause the surfaces of the rubber crumb particles to be seared and the rubber crumb particles are carried by the stream across the reaction chamber 1 and into the downwardly directed flow of cooling air from the air inlet 9. The flow of cooling air from the air inlet 9 quenches the heat treatment of the surfaces of the rubber crumb particles and assists in the transfer of the heat treated crumb downwardly to the bottom end 10 of the reaction chamber 1 from which it may be collected. In addition to quenching the heat treatment of the rubber crumb and assisting in the downward transfer of the treated rubber crumb the downwardly directed flow of cooling air from the air inlet 9 aids the combustion of gas from the gas burner 6 by maintaining a flow of air through the reaction chamber 1.

Treated crumb passing out from the bottom end 10 of the reaction chamber 1 may be collected in a hopper or it may be allowed to fall onto a continuously moving conveyor belt.

The use of the apparatus of FIG. 1 is particularly preferred because it facilitates the treatment of rubber crumb obtained from tyres. Rubber crumb obtained from tyres usually includes textile residues. The removal of these textile residues has proved extremely difficult and this difficulty has inhibited the re-use of rubber obtained from tyres. When rubber crumb obtained from tyres is thermally treated in the apparatus of FIG. 1 as described, it is found that textile fibres in the crumb are either carbonised or completely burnt away and there is no evidence remaining of any contaminant fibre.

In test apparatus having the configuration of the apparatus of FIG. 1, the reaction chamber 1 was 82cm in height and had an internal diameter of 15.5cm. The chute 5 was 2cm in diameter and the air inlet 9 was also 2cm in diameter. The gas burner 6 was rectangular in cross-section at the point where it entered the reaction chamber 1, having a width of 2cm and a height of 1.5cm. The gas burner 6 was extended through an orifice 3cm in diameter in the wall of the reaction chamber 1.

In operation, the feed control mechanism was adjusted to feed rubber crumb through the chute 5 at a rate of the order of 200 grams per minute. The gas burner 6 was fed with butane gas and the flame was adjusted so that the "blue zone" of the flame was of the order of 3.5cm in length. The chute 5 was situated so that the rubber crumb particles were dropped vertically into the "blue zone" of the flame. The air supply was adjusted to provide a downwardly directed flow of cooling air at a rate of 250 liters per minute through the air inlet 9.

The following Examples are illustrative of methods in accordance with the present invention utilising the test apparatus described with reference to FIG. 1.

EXAMPLE 1

Ground whole tyre vulcanised rubber crumb capable of passing through a sieve of 30 meshes/inch was treated in the test apparatus.

The treated whole tyre rubber crumb was tested relative to untreated whole tyre rubber crumb. 100 parts by weight of the treated whole tyre rubber crumb were blended with 100 parts by weight of an unvulcanised rubber compound which contained styrene-butadiene rubber compound and high abrasion furnace black in a ratio of 100 parts to 72 parts together with 2 to 3 parts of vulcanising agents and antioxidants. The blend of treated crumb and unvulcanised rubber was formed into ⅛ inches thick slabs and vulcanised in a moulding press for 25 minutes at 155° C. Similar slabs were formed from a blend of 100 parts by weight of untreated whole tyre rubber crumb with 100 parts by weight of the unvulcanised rubber compound. On testing according to British Standard Specification No. 903, the slabs containing the treated crumb were found to have a tensile strength of 1,523 p.s.i. and an elongation at break of 410%, which were considerably superior to the tensile strength of 1,168 p.s.i. and elongation at break of 360% exhibited by the slabs containing the untreated crumb.

Some of the treated crumb was tumble mixed with powdered vulcanising ingredients according to the formulation:

|  | parts by weight |
|---|---|
| Treated whole tyre rubber crumb | 100.00 |
| Zinc oxide | 2.00 |
| Stearic acid | 2.00 |
| Sulphur | 1.00 |
| N-cyclohexyl-2-benzthiazole sulphenamide | 0.32 |

The formulation was fed into the nip of a two roll rubber mixing mill with the rolls at approximately 40° C. to form a rough but coherent sheet on cutting from the rolls. The formulation was then moulded in a compression mould with a hemispherical cavity of 6cm diameter to produce a hollow hemisphere of 0.5cm wall thickness. The mould had been preheated in an open daylight press with plattens heated to 170° C. before charging. The mould was returned to the press and the formulation was vulcanized for 3 minutes. On removal from the press, the product was immediately removed from the mould, while it was still hot, and was found to be no longer plastic, but vulcanised and with rubbery properties.

EXAMPLE 2

Vulcanised natural rubber moulding scrap was ground on a two roll rubber mill to form particles which were ungraded, but which had a maximum size of the order of 0.5mm, and these rubber particles were subjected to treatment in the test apparatus. The product of the treatment was a loosely coherent fluffy crumb.

The treated rubber particles were mixed on a rubber mill with vulcanising ingredients according to the formulation:

|  | parts by weight |
|---|---|
| Treated moulding rubber crumb | 100.00 |
| Zinc oxide | 1.00 |
| Stearic acid | 1.00 |
| Sulphur | 0.50 |
| N-cyclohexyl-2-benzthiazole sulphenamide | 0.16 |

Some of this formulation was used to form vulcanised test pieces which were tested in accordance with British Standard Specification No. 903. The vulcanised test pieces were found to have a tensile strength of 1,815 p.s.i. and an elongation at break of 470%, comparing most favourably with vulcanised products obtained from first grade whole tyre reclaim rubber which typically exhibit tensile strength in the range 850 p.s.i. to 900 p.s.i. and elongation at break of 300% to 350%.

A single cavity toroidal O-ring mould was charged with some of the formulation prepared above, and the formulation was vulcanised in an open daylight moulding press for 10 minutes at 150° C. The product was stripped from the mould while still hot, and was found to be non-plastic but vulcanised and with very good elastic properties.

EXAMPLE 3

Vulcanised natural rubber moulding scrap was ground and treated in the apparatus of FIG. 1, as in Example 2. The treated rubber crumb was not mixed with vulcanising ingredients, but it was charged directly into a flat sheet plunger mould, inserted into a vulcanising press and heated at 150° C. for 30 minutes. On opening the mould it was found that the ground scrap had consolidated to a substantially homogeneous sheet which was removed hot from the mould and was no longer plastic. It was presumed that vulcanisation was consequent upon migration of residual vulcanising ingredients from within the core portions of the treated rubber particles into the plastic outer layers of the treated rubber particles.

Referring to FIG. 2 of the drawings the apparatus includes a substantially cylindrical reaction chamber 1 which is open at both its upper end 3 and its bottom end 10. At the upper end 3 of the reaction chamber 1, there is provided a hopper 2 having feeder means which comprises a feed control mechanism 4 and a chute 5 situated within the open upper end 3 of the reaction chamber 1 to leave a substantially annular opening 11 about the chute 5.

An inlet tube 12 which opens into the side of the reaction chamber 1, is connected to an air supply (not shown). One or more electrical resistance elements 13 are mounted within the inlet tube 12 and are controlled so that, in operation of the apparatus of FIG. 2, air passing out from the inlet tube 12 into the reaction chamber 1 is sufficiently hot that, if a piece of paper were placed at the junction between the inlet tube 12 and the reaction chamber 1, it would ignite substantially instantaneously. Hot air from the inlet tube 12 rises within the reaction chamber 1 and passes out through the annular opening 11. Provision may be made for closing off parts of the annular opening 11, for varying the size of the opening from the inlet tube 12 into the reaction chamber 1, and for varying the rate of supply of air to the electrical resistance element or elements 13 in order to effect variations in the temperature and flow conditions within the reaction chamber.

A conveyor belt 14 is provided beneath the bottom end 10 of the reaction chamber 1 for the removal and cooling of heat treated rubber crumb.

In operation of the apparatus of FIG. 2, vulcanised rubber crumb is placed in the hopper 2, from which it is fed into the reaction chamber 1 through the chute 5 by the feed control mechanism 4. The rubber crumb falls under the action of gravity and encounters hot air rising from the inlet tube 12. The conditions encountered by the rubber crumb become progressively hotter until the rubber crumb passes the inlet tube 12. As the rubber crumb passes down the reaction chamber 1 the surfaces of the pieces of rubber crumb become plasticised. The treated crumb falls through the open bottom end 10 of the reaction chamber 1 onto the conveyor belt 14, and is removed by the conveyor belt 14 for cooling.

In experimental apparatus constructed in accordance with FIG. 2, the reaction chamber 1 had a height of 118 cm and an internal diameter of 10cm. The chute 5 had an internal diameter of 2cm and the inlet tube 12 had an internal diameter of 3.5cm. In operation of the apparatus, the feed control mechanism 4 was adjusted to feed rubber crumb through the chute 5 at a rate of 200 grams per minute and the flow of air from the air supply to the inlet tube 12 was adjusted so that heated air passed from the inlet tube 12 into the reaction chamber 1 at a rate of 87 liters per minute. At the junction of the inlet tube 12 and the reaction chamber 1 the air was at a temperature of the order of 900° C.

If desired, heated gases other than air may be passed through the inlet tube 12 for the treatment of the rubber crumb, so long as the gases chosen do not react with the rubber in such a way that the ability of the outer layers of the treated rubber crumb to the vulcanised or otherwise cross-linked is impaired.

Referring to FIG. 3 of the drawings, there is shown an apparatus in which rubber crumb is passed through a plurality of zones of heat. Rubber crumb is placed in a hopper 2 from which it passes on to a conveyor belt 19, the speed of which is adjustable in order to vary the rate of supply of rubber crumb from the hopper 2. The conveyor belt 19 feeds the rubber crumb to a reaction chamber 1 through the upper end 3 of the reaction chamber 1, which is open. The conveyor belt 19 and the hopper 2 are shielded from heat by a heat shield 20.

Three opposed pairs of gas burners 6 are disposed at spaced intervals down the length of the reaction chamber 1. The gas burners 6 are similar in construction to conventional burner elements in domestic gas ovens. The gas burners 6 are pivotally mounted within the reaction chamber 1 such that they may pivot through an angle of 90° in order to provide adjustment of the angles at which flames issue from the gas burners 6. The gas burners 6 are connected by connecting tubes 7, each of which includes a tap 21 to a gas supply.

A pair of air inlet tubes 23 are mounted in the reaction chamber 1, beneath the lowermost pair of gas burners 6. Each of the air inlet tubes 22 is provided either with a longitudinal slit 23 or a plurality of apertures spaced along its length to allow air to escape into the reaction chamber. The air inlet tubes 22 are pivotally mounted within the reaction chamber 1 in a manner similar to the gas burners 6, and they are so arranged that they provide a downwardly moving curtain of air within the reaction chamber 1. The air inlet tubes 22 are connected to an air supply by a connecting tube 24.

Rubber crumb particles fed to the open upper end of the reaction chamber 1 by the conveyor belt 19 fall under the action of gravity through the reaction chamber 1 between the successive pairs of gas burners 6. The gas burners 6 provide flame, heated air the gaseous combustion products which cause the surfaces of the rubber crumb particles to be seared. When the rubber crumb particles reach the downwardly moving curtain of air provided by the air inlet tubes 22, the heat treatment of the surfaces of the rubber crumb particles is quenched. The downwards movement of the air from the air inlet tubes 22 assists the action of gravity in the transfer of heat treated rubber crumb donwardly to the bottom end 10 of the reaction chamber 1. The bottom end 10 is open and allows the heated rubber crumb to fall, for example, into a hopper or on to a conveyor belt for collection.

Provision may be made for the insertion of thermocouples at various points in the reaction chamber 1 of the apparatus of FIG. 3 in order to assist in achieving optimum temperature distributions within the reaction chamber 1.

Rubber particles may be treated by methods in accordance with the present invention by subjecting the rubber particles to the action of heat without causing the rubber particles to fall under gravity, through a zone or zones of heat, as will be understood from the following Example.

EXAMPLE 4

Approximately 500gm of ground whole type vulcanised rubber crumb, capable of passing through a sieve of 30 meshes/inch, was spread evenly and thinly on a metal tray. The flame from a pressure fed butane/air burner was played on the exposed surface of the crumb while the burner was kept in motion such that the crumb fumed but did not reach the point of ignition. After several passes of the flame across the entire exposed surface, and allowing to cool between passes, the crumb was raked to expose fresh surfaces and the flame treatment repeated. Two futher cycles were repeated, by which time the treated rubber crumb thereby obtained tended to aggregate into fluffy clumps.

The treated rubber crumb prepared above was mixed with vulcanising ingredients on a two roll mill, with the rolls at 40° C. and according to the formulation:-

|  | parts by weight |
| --- | --- |
| Treated whole-tyre rubber crumb | 100.00 |
| Stearic acid | 0.25 |
| Zinc oxide | 1.25 |
| Sulphur | 0.50 |
| Mercaptobenzthiazole | 0.12 |
| Tetramethylthiuram disulphide | .12 |
|  | 102.25 |

A rough band was formed on the mill during mixing. Some of the formulation was transferred from the mill to a flat sheet mould, and was vulcanised between the plattens of a press heated to 150° C. for 15 minutes. On stripping hot from the mould, it was found that the product was no longer plastic but had been converted into a substantially homogeneous vulcanised product which had good rubbery properties.

Part of the formulation was used to form vulcanised test pieces which were tested according to British Standard Specification No. 903. The test pieces exhibited a tensile strength of 1,420 p.s.i. and an elongation at break of 250%, which compare favourably with the tensile strengths of from 850 p.s.i. to 900 p.s.i. and elongations at break of from 300% to 350% of vulcanised products obtained from first grade whole tyre reclaim rubber.

Accordingly treatment of rubber particles in accordance with the present invention can be effected by the use of movement of either the particles or the zone of heat in a horizontal plane.

The appearance and texture of rubber crumb following thermal treatment by a method in accordance with the present invention varies depending upon the extent of the treatment and also the nature and composition of the vulcanised rubber crumb before treatment. For example, the treated rubber crumb may take the form of a loosely aggregated material having a tacky surface or it may be a free flowing material having a dusty surface appearance.

FIG. 4 of the drawings illustrates diagrammatically a segment which has been cut away from a rubber particle which has undergone thermal treatment in accordance with the present invention. The particle has a core portion 15 which remains non-plastic. The core portion 15 is surrounded by an intermediate zone 16 which is partially plasticised and this intermediate zone is in turn surrounded by an outer layer 17 which is substantially completely plasticised and is miscible either with the outer layers of other particles of treated rubber crumb or with unvulcanised rubber compound. The outer surface 18 of the outer layer 17 may in some instances be coated at least in part with free carbon residues from the combustion of either textile residues in the crumb prior to treatment or from limited surface combustion experienced during the heat treatment.

The boundaries between the core portion 15 and the intermediate zone 16 and the intermediate zone 16 and the outer layer 17 are not clearly defined and there is a gradual gradation in the degree of plasticity from the core portion 15 which is non-plastic to the outer surface 18 at which the rubber is fully plasticised. When the treated rubber particles are consolidated or when they are blended with unvulcanised rubber compounds no clearly defined interfaces between particles are observable. On cross-linking of the consolidated particles or the blend of particles with unvulcanised rubber compound a substantially homogeneous product is formed which is free from the obvious presence of individual rubber particles.

In Examples 1 to 4 surface layers of pieces of vulcanised rubber are rendered plastic by application of heat while the inner cores of the pieces of rubber remain non-plastic. However, the present invention also comprehends methods of treating pieces of cross-linked nonplastic rubber in which the surface layers of the pieces are treated with a chemical reagent. An example of the treatment of pieces of cross-linked non-plastic rubber with a chemical reagent is as follows:

EXAMPLE 5

A scrap rubber material, which was a flexible and expanded polyurethane formed by the interaction of an adipate polyester, 1,4 butanediol and 4,4' diphenylmethane diisocyanate, was steeped 10% w.v. hydrochloric acid for 30 minutes at room temperature. The rubber material was drained and as much acid as possible was removed by squeezing. The rubber material was then transferred to a pressure vessel into which steam was passed and maintained at a pressure of 4 p.s.i. above atmospheric pressure for 10 minutes. On removal from the pressure vessel, the rubber material was found to have disintegrated into crumb pieces. These were washed thoroughly in water to remove any residual superficial traces of acid, drained and dried in air to remove substantially all moisture. The rubber crumb pieces, when consolidated by mechanical pressure were found to adhere together, which property was not observed when the untreated expanded polyurethane material had been similarly compressed. Some of the treated rubber crumb was immersed in ethyl acetate solvent in which swelling took place, but the crumb was only partially dissolved, thus indicating that only superficial depolymerisation had taken place.

When the treated rubber crumb was mixed with 10% be weight of 4,4' diphenylmethane diisocyanate, and consolidated under pressure, it was found that after 5 hours at room temperature, the consolidated material was no longer either thermoplastic or soluble in ethyl acetate.

It is believed that the treatment probably proceeds by acid catalysed hydrolysis of the polyester component of the cross-linked polyurethane material. In the dilute acid used, only a very small amount of HCl would be present in the undissociated form suitable for absorption into the polyurethane material. This, coupled with the very short immersion time would tend to concentrate the catalytic presence of the HCl in the outer layer of the polyurethane only, and, on subsequent subjection to the chemically hydrolytic presence of water at high temperature the consequent depolymerisation would therefore tend to occur predominantly in the surface layers. However this is only a tentative theory which has not been proved. Other forms of chemical treatment will be appropriate to other types of rubber, and it will be readily appreciated that it is necessary to choose a chemical treatment which is suited to the chemical nature of the rubber to be treated.

It can be seen from this example that vastly different mechanisms may be employed in plasticising only the outer layers of a previously cross-linked rubber material.

Pieces of rubber material having an inner core of non-plastic rubber and a surface layer which is plastic in accordance with the present invention may be used in substantially all the processes which have hitherto employed either vulcanised rubber crumb or the so called "reclaim rubber" which is a completely plasticised product prepared from vulcanised rubber. However, pieces of rubber treated by methods in accordance with with present invention have the advantage over untreated rubber crumb that they may be used in the manufacture of cross-linked rubber products without any need for blending with fresh unvulcanised rubber. One advantage of pieces of rubber material treated by methods in accordance with the present invention over "reclaim rubber" is that it may be formed and vulcanised in the presence of sufficient additional vulcanising or other cross-linking agents for cross-linking of the plasticised and partially plasticised parts only of the rubber pieces. In cases where the vulcanising or other cross-linking agents in the untreated rubber material were incompletely consumed and remain in the inner cores of the treated rubber pieces they may be sufficient upon migration into the plasticised and partially plasticised parts of the treated rubber either to wholly or partially overcome the need for including additional vulcanising or other cross-linking agents.

The methods which have been specifically described of treating rubber materials in order to obtain pieces of rubber material having inner cores of non-plastic rubber and suface layers which are plastic have the advantage that they require a lower energy input in the preparation of a useful material from given rubber materials than the known methods of preparing "reclaim rubber" from those materials. This is in part due to the fact that only the outer layers of the rubber pieces are treated and the core portions of the pieces of treated rubber are substantially unchanged, whereas the known methods of preparing "reclaim rubber" involve plasticising the entire mass of the rubber by a combination of added heat, action of chemical additives and mechanical work. The methods which have been specifically described and which involve a heat treatment alone to obtain pieces of rubber material having inner cores of non-plastic rubber and surface layers which are plastic have the further advantage over the known methods of preparing "reclaim rubber" that chemical additives are not used. It will be appreciated that savings in energy expenditure and/or the use of chemical additives will result in appreciable cost advantages. Furthermore vulcanised rubber crumb which usually includes textile residues may readily be treated as hereinbefore described by methods in accordance with the present invention, whereas rubber crumb which includes textile residues has generally been unacceptable for the preparation of "reclaim rubber".

I claim:

1. A method of reclaiming vulcanised rubber which comprises the step of searing the surface of vulcanised rubber by direct application thereto of at least one flame for a time insufficient for the vulcanised rubber to ignite and thereby causing a surface layer of the vulcanised rubber to be rendered plastic by devulcanisation whilst an inner core of the rubber remains vulcanised and non-plastic.

2. A method according to claim 1 which comprises the step of causing a flame derieved from a gas/air burner to pass over the vulcanised rubber at a speed such that the rubber fumes but does not ignite.

3. A method according to claim 1 which comprises the steps of causing vulcanised rubber crumb to fall under gravity into the blue zone of a flame derived from a pressure fed gas/air burner and thereafter quenching the rubber crumb by a stream of cooling air.

4. A method according to claim 1 which comprises the step of causing vulcanised rubber crumb to fall under gravity into the blue zone of a flame derived from a pressure fed butane/air burner.

5. A method according to claim 3 wherein the rubber crumb is a rubber crumb obtained from tires and includes textile residues, and wherein the textile fibres in the rubber crumb are removed therefrom by the action of the flame.

6. A method of reclaiming vulcanised rubber which comprises the step of causing the surfaces of vulcanised rubber crumb to be seared by exposing the vulcanised rubber crumb directly heated gases which gases directly heat the rubber crumb to a temperature at which the surface of the rubber sears, the exposure being for a time insufficient for burning to commence, whereby the surface layers of the rubber crumb are rendered plastic by devulcanisation, whilst the inner cores of the rubber crumb remain vulcanised and nonplastic.

7. A method according to claim 6 wherein the vulcanised rubber crumb is exposed to the said temperature by causing the vulcanised rubber crumb to fall through a reaction chamber to which heated gases are fed, such that the heated gases rise through the reaction chamber whilst the rubber crumb fall therethrough.

8. A method according to claim 7 wherein the heated gases are fed to the reaction chamber at a temperature of the order of 900° C.

9. A method according to claim 5 whereing the rubber crumb is capable of passing through a sieve of 30 mesh/inch.

10. A method according to claim 5 wherein the rubber crumb has a maximum size of the order of 0.5 mm.

* * * * *

UNITED STATES PATENT OFFICE
CERTIFICATE OF CORRECTION

Patent No. 4,125,578　　　　　　Dated November 14, 1978

Inventor(s) Derek W. SEAR

It is certified that error appears in the above-identified patent and that said Letters Patent are hereby corrected as shown below:

Column 11, line 13, "derieved" should read --derived--

Column 12, line 6, insert --to-- after "directly"

Column 12, line 22, "whereing" should read --wherein--.

Signed and Sealed this

Eighth Day of May 1979

[SEAL]

Attest:

RUTH C. MASON
Attesting Officer

DONALD W. BANNER
Commissioner of Patents and Trademarks